United States Patent
Shuman et al.

(10) Patent No.: US 6,236,644 B1
(45) Date of Patent: May 22, 2001

(54) METHOD OF SETTING UP A CONFERENCE CALL

(75) Inventors: Steven S. Shuman, Monument; William A. Sims, Colorado Springs, both of CO (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 08/968,154

(22) Filed: Nov. 17, 1997

(51) Int. Cl.[7] .................................................. H04L 12/16
(52) U.S. Cl. .............................................. 370/261; 379/202
(58) Field of Search .................................. 370/259, 260, 370/261, 262, 263, 264; 379/202, 203, 204, 205, 206, 207, 201, 220, 225, 229; 455/414, 416

(56) References Cited

U.S. PATENT DOCUMENTS

| | | | |
|---|---|---|---|
| 4,348,554 | * | 9/1982 | Asmuth ................................ 379/113 |
| 5,339,356 | * | 8/1994 | Ishii .................................... 379/234 |
| 5,408,526 | * | 4/1995 | McFarland et al. ................. 379/202 |
| 5,490,212 | * | 2/1996 | Lautenschlager ................... 379/225 |
| 5,511,071 | * | 4/1996 | Gloess ................................. 370/62 |
| 5,638,434 | * | 6/1997 | Gottlieb et al. ..................... 379/203 |
| 5,701,340 | * | 12/1997 | Zwick ................................. 379/204 |
| 5,812,652 | * | 9/1998 | Jodoin et al. ....................... 379/205 |
| 5,812,653 | * | 9/1998 | Jodoin et al. ....................... 379/205 |
| 5,822,306 | * | 10/1998 | Catchpole .......................... 370/261 |
| 5,825,858 | * | 10/1998 | Shaffer et al. ..................... 379/120 |
| 5,828,743 | * | 10/1998 | Pinnell et al. ..................... 379/204 |
| 5,844,973 | * | 12/1998 | Venkatraman et al. ............ 379/127 |
| 5,867,562 | * | 2/1999 | Scherer .............................. 379/112 |
| 5,894,510 | * | 4/1999 | Felger ................................ 379/114 |
| 6,005,845 | * | 12/1999 | Svennesson et al. .............. 370/260 |
| 6,032,118 | * | 2/2000 | Tello et al. ........................... 705/1 |

\* cited by examiner

Primary Examiner—Seema S. Rao
Assistant Examiner—Brian Nguyen

(57) ABSTRACT

A method of setting up a conference has the following steps: 1) selecting a conference bridge (68) and a conference number; 2) dialing a conference number; 3) when a private branch exchange (52) seizes an off-network trunk (55), receiving the conference number at a interexchange carrier service switching point; 4) routing the conference call to a local exchange carrier service switching point (74); 5) routing the conference call over a dedicated access line (78) to an on-network service switching point (76); 6) triggering on the conference call at the on-network service switching point (76); 7) sending a query to a service control point (58); 8) receiving a routing instructions from the service control point (58); and 9) routing the conference call to the conference bridge (68).

18 Claims, 5 Drawing Sheets

METHOD OF SETTING UP A CONFERENCE CALL

FIELD OF THE INVENTION

The present invention relates generally to the field of telecommunications and more particularly to a method of setting up a conference call.

BACKGROUND OF THE INVENTION

Conference calls have proved a cost effective way to hold meetings with people who are located in different parts of the country. The audio quality of a conference call is maintained by connecting all the parties together through a conference bridge. The conference bridge often belongs to a different service provider than the originating service providers for all the parties to the conference call. In addition, the telephone number assigned to the conference bridge is not fixed and may not follow the standard North American Numbering Plan. As a result, when a customer dials the assigned conference number the local exchange carrier has to reoriginate the conference call as an "800" number to the service provider having the conference bridge. This increases the costs of the conference call without providing any benefit to the customer.

Another problem occurs when a customer has a private branch exchange (PBX) with several service providers including the service provider having the conference bridge. If the customer desires to place an on-network conference call through the service provider with the conference bridge, they cannot ensure that the PBX will select the on-network service provider. When the PBX does not select the on-network service provider the conference call cannot be placed and the call will fail.

Thus there exists a need for a method of setting up a conference call that reduces the cost of a conference call and will work for a PBX customer wanting to place an on-network conference call.

SUMMARY OF THE INVENTION

A method of setting up a conference call that overcomes these and other problems has the following steps: (1) selecting a conference bridge and a conference number; (2) dialing a conference number; (3) when a private branch exchange seizes an off-network trunk, receiving the conference number at a interexchange carrier service switching point; (4) routing the conference call to a local exchange carrier service switching point; (5) routing the conference call over a dedicated access line to an on-network service switching point; (6) triggering on the conference call at the on-network service switching point; (7) sending a query to a service control point; (8) receiving a routing instructions from the service control point; and (9) routing the conference call to the conference bridge.

Using the method described above it is no longer necessary for the local exchange carrier to reoriginate the conference call as an "800" number to the service provider of the conference bridge. This reduces the cost of completing a conference call. This method also allows a customer having a PBX connected to several service providers, to place on-network conference calls. This is because the method does not require that the PBX select the on-network service provider in order to complete the call to the service provider's conference bridge. This simplifies the process of placing a conference call for PBX customers.

DETAILED DESCRIPTION OF THE DRAWINGS

Figure 1:
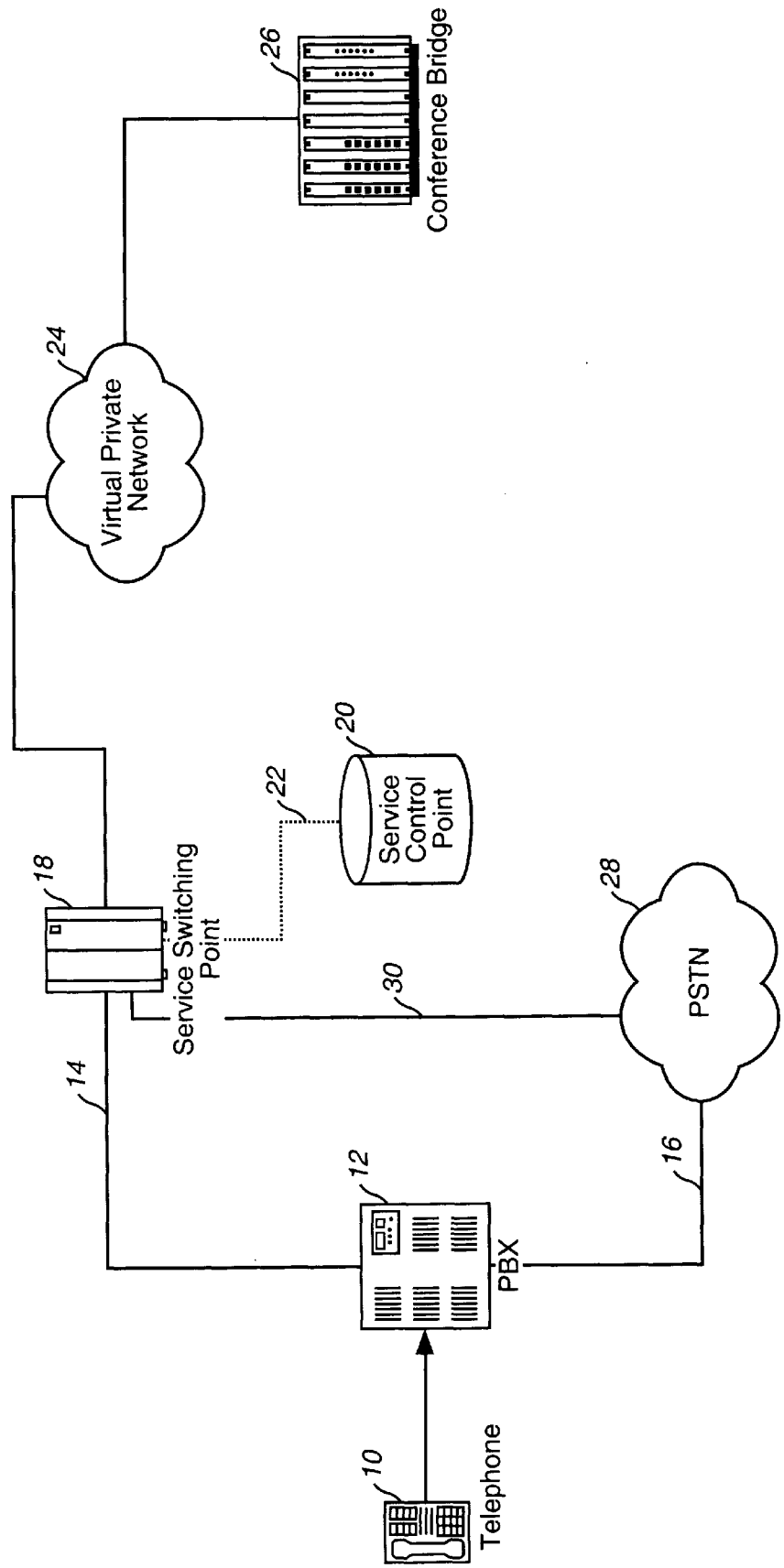
FIG. 1 is a block diagram of a telephony system for setting up a conference call.

FIG. 1 shows a block diagram of a telephony system for setting up a conference call. A customer location has a plurality of telephones 10 connected to a private branch exchange (PBX) 12. The private branch exchange 12 is coupled to an on-network trunk 14 and an off-network trunk 16 (at least two interexchange carriers (IXC) 14, 16). The on-network trunk 14 is connected to an on-network service switching point (SSP) 18. The service switching point 18 is an intelligent switch that routes calls. The service switching point 18 is connected to a service control point (SCP) 20 through a control channel 22. The service control point 20 provides additional information to the service switching point 18, such as designating this call as a conference call, routing instructions to the appropriate conference bridge and billing information. The service switching point 18 is part of a virtual private network (on-network) 24 that connects the conference call to one of a plurality of conference bridges 26 located throughout the virtual private network 24.

The private branch exchange 12 is also connected to the off-network trunk 16. The off-network trunk 16 connects to the public switched telephone network (PSTN) 28. The interexchange carrier (part of the PSTN) connected to the off-network trunk 16 is connected to the service switching point (conference switch, virtual private network switch) 18 via a dedicated access line 30. It should be understood that the virtual private network 24 encompasses the SSP 18, the control channel 22, the SCP 20 and the conference bridge 26. These elements are broken out separately for clarity and the cloud 24 designates that the conference call can pass through several switches before arriving at conference bridge 26.

When the customer desires to schedule a conference call he places a phone call to a reservation system. The reservation system assigns an on-network conference call number, alternative off-network conference call number, a conference bridge for the assigned time and a conference call ID. This information is then passed along to a service control point. The customer dials the conference number (on-network telephone number) at the preassigned time from the telephone 10. The PBX 12 seizes either the on-network trunk 14 or the off-network trunk 16. When the PBX 12 seizes the on-network trunk 14 the service switching point 18 is connected to the PBX 12 by a dedicated access line 14. The service switching point 18 triggers on the incoming call because it is on a dedicated access line. The service switching point 18 sends a query over the control channel 22 to the service control point 20. The query includes the following information: the originating switch, originating trunk, and dialed digits. The service control point 20 returns routing instructions based on the conference number. The routing instructions include the terminating switch, the conference ID and a conference call code. The virtual private network 24 then routes the call to the conference bridge 26. The conference bridge 26 then connects all the conferees together.

When the PBX 12 seizes an off-network trunk 16, the call is routed by the interexchange carrier over the PSTN 28 to the service switching point 18. The call is routed over the PSTN 28 using the standard North American Numbering Plan (or other country's standard routing scheme) routing scheme (standard routing procedure). Note that the call may be routed by at least the originating interexchange carrier and another local exchange carrier before reaching the service switching point 18. The service switching point 18 triggers on the incoming call because it arrives via the dedicated access line 30. In another embodiment the service switching point triggers because the incoming call has a destination number that belongs to a predetermined group of numbers. The service switching point 18 then sends a query to the service control point 20 and receives routing instructions. Based on these routing instructions, the call is routed to the virtual private network 24 and then on to the conference bridge 26.

Figure 2:
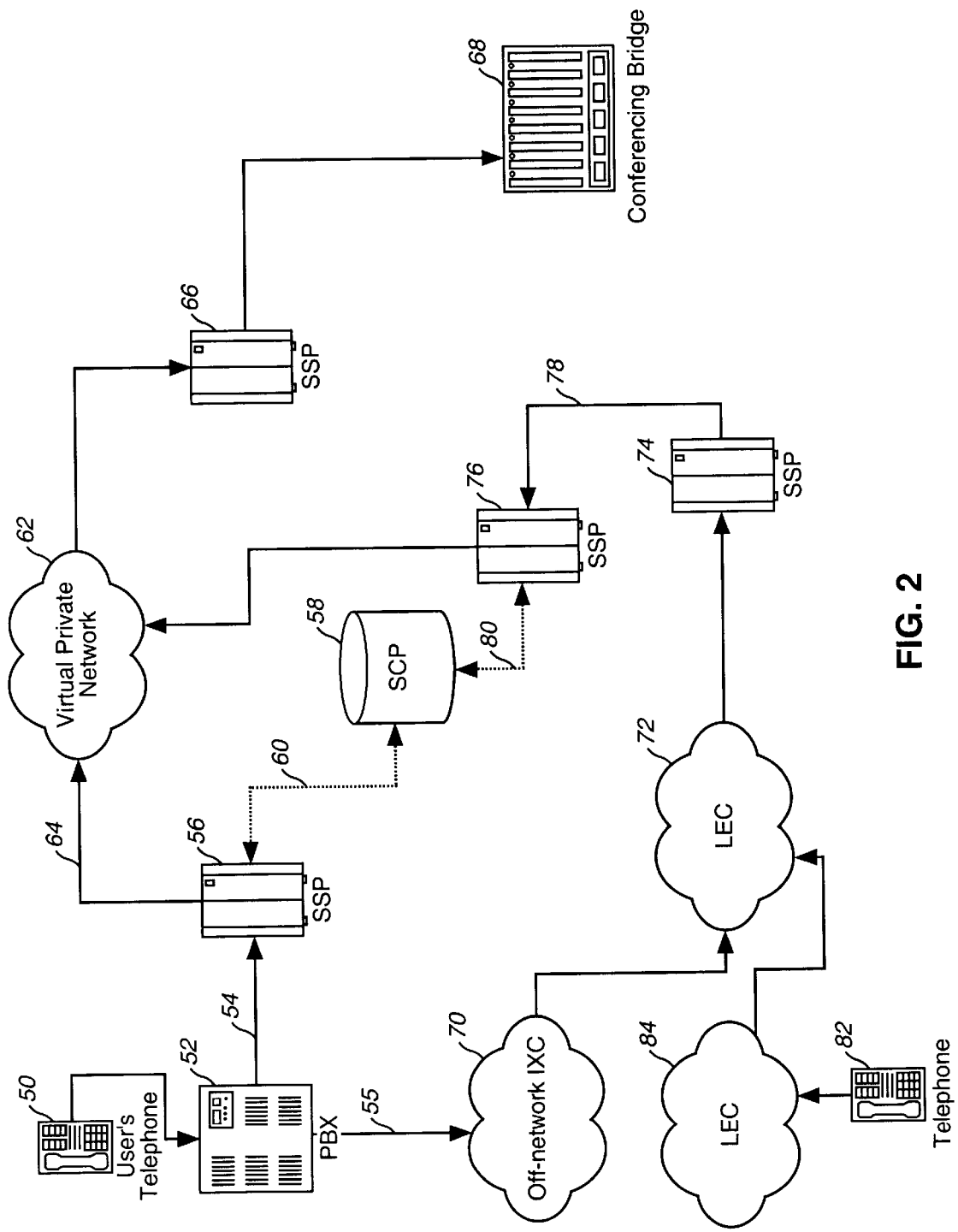
FIG. 2 is another embodiment of a block diagram of a telephony system for setting up a conference call.

FIG. 2 is a block diagram of another embodiment of a telephony system for setting up a conference call. In this embodiment a first user's telephone 50 is connected to a PBX 52. The PBX 52 is connected to an on-network trunk (dedicated access line) 54 and to an off-network trunk 55. The on-network trunk 54 is connected to a first service switching point (SSP) 56. The SSP 56 is connected to a service control point 58 by a control network 60. The SSP 56 is connected to a virtual private network 62 over a voice/data channel 64. The virtual private network is connected to a second SSP 66 that is connected to a designated conference bridge 68.

The off-network trunk 55 is connected to an off-network interexchange carrier (IXC) 70. The IXC 70 is connected to a first local exchange carrier 72. The local exchange carrier 72 is connected to a second local exchange carrier's service switching point 74. The second local exchange carrier's SSP 74 is connected to a virtual private network SSP 76 over a dedicated access line 78 in one embodiment. The virtual private network SSP 76 is connected to the service control point 58 by a control channel 80. The virtual private network SSP 76 connects to the virtual private network 62. The virtual private network 62 is connected to the second SSP 66, which is connected to the conferencing bridge 68. Note that the virtual private network 62 includes the SSP 56, voice line 64, control network 60, SCP 58, SSP 76, control network 80, SSP 66 and conference bridge 68.

A second customer telephone 82 is directly connected to a second local exchange carrier 84. The second local exchange carrier 84 is connected via the PSTN to the first local exchange carrier 72.

Using FIG. 2 several embodiments of the invention will be described. In the first embodiment, the PBX 52 is only connected to the on-network trunk 54. In this case PBX 52 connects conference caller with the first SSP 56 over a dedicated access line 54. The first SSP 56 is part of the on-network or virtual private network. Thus the first SSP 56 triggers either because the call is received over a dedicated access line 54 or because the dialed digits belong to a predetermined set of numbers. The SSP 56 queries the SCP 58 for routing instructions. The SCP 58 sends back routing instructions and information about the conference call. The virtual private network (VPN) 62 then routes the call through SSP 66 to the conference bridge 68.

In another embodiment the PBX 52 is connected to at least two interexchange carriers 54, 55. When the PBX 52 seizes the on-network trunk 54 the call proceeds as described above. When the PBX seizes the off-network trunk 55, the off-network IXC (interexchange carrier service switching point) 70 routes the call based on standard North American Plan Numbering routing. The call is received by the LEC 72 that continues to route the call using standard processing to the second LEC SSP 74. The second LEC SSP 74 determines that the dialed number belongs to a predetermined set of telephone numbers and routes the call over the dedicated access line 78 to the virtual private network SSP 76. The SSP 76 triggers on the incoming call because the call is received over the dedicated access line 78. The SSP 76 sends a query to the SCP 58 and receives routing instructions to the conference bridge 68. The call is then routed through the VPN 62 and SSP 66 to the conference bridge 68.

In another embodiment the PBX 52 is programmed to determine if dialed number belongs to a predetermined set of numbers, such as a pseudo-telephone number (non-North American Dialing Plan number), on-network numbers or an unused group of standard numbers. When the dialed number belongs to the predetermined set of numbers the call is routed over the dedicated access line (on-network trunk) 54 to the on-network SSP 56. Processing then proceeds as described above for the on-network case.

In another embodiment the conference call number is a pseudo number. When the PBX 52 seizes the on-network trunk 54 processing proceeds as a standard on-network call. When the PBX 52 seizes the off-network trunk 55, the off-network IXC 70 is unable to place the call. The off-network IXC 70 then returns a message that the call cannot be completed.

In another embodiment the conferee places the call from telephone directly connected to the LEC 84. In this case the conference telephone number can be either an "800" number or on-network telephone number that conforms to the North American Numbering Plan. Assuming the conference number conforms to the North American Numbering Plan the LEC 84 routes the call using standard routing through the PSTN to another LEC 72. The LEC 72 routes the call to a second LEC SSP (local switch) 74. A group of numbers are reserved at this SSP 74 for conference calls. When a call to one of the group of reserved numbers is received at the SSP 74, it is routed over the dedicated access line 78 to virtual private network SSP 76. The SSP 76 triggers on the incoming call because it is received over the dedicated access line 78. The SSP 76 then sends a query to the SCP 58 and receives routing instructions. Based on these routing instructions, the call is routed through the VPN 62, the SSP 66 to the conferencing bridge 68.

Figure 3:
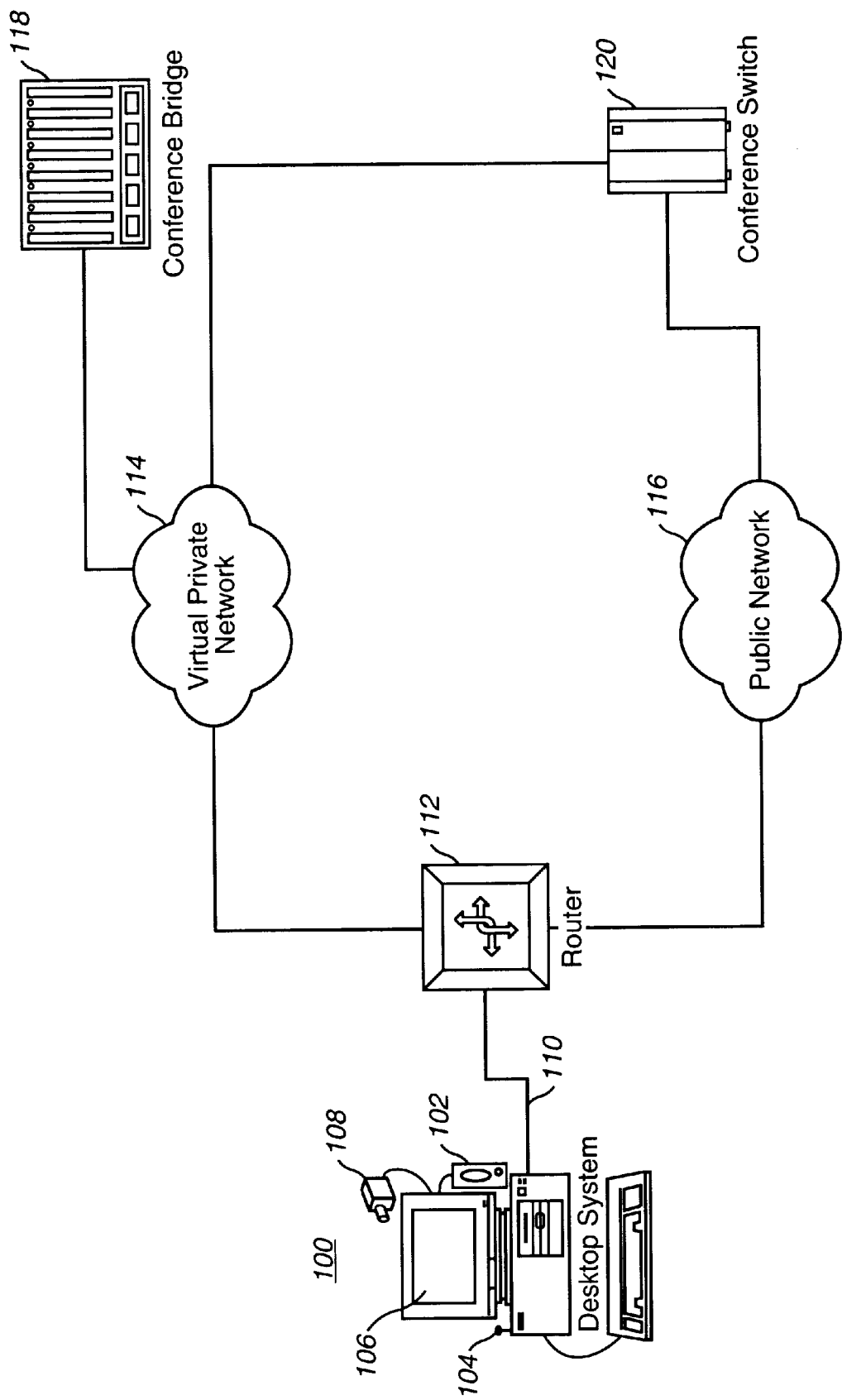
FIG. 3 is another embodiment of a block diagram of a telephony system for setting up a conference call.

FIG. 3 is a block diagram of another embodiment of a telephony system for setting up a conference call. In this embodiment a customer uses a desktop system 100 at a customer location (subscriber location). In one embodiment, the desktop system 100 is a computer with a speaker 102, a microphone 104, a display 106 and optionally a camera 108. The desktop system 100 is connected through a local area network 110 to a router (customer switch) 112. The router 112 is connected to a virtual private network 114 and a public network 116. The virtual private network 114 is connected to a conference bridge 118. The public network is connected to a conference switch (router) 120. The router 120 is connected to the virtual private network 114.

The user places a conference call by entering a conference address on the desktop system 100. The customer switch (router) 112 can seize either a connection to the virtual private network 114 or to the public network 116. When the connection to the public network 116 is seized, the call is routed using standard routing (e.g., TCP/IP routing) to the conference switch 120. The conference switch 120 then determines that the conference address requires routing to the virtual private network 114. The virtual private network 114 then routes the call to the designated conference bridge 118. When the router 112 seizes the connection to the virtual private network 114, the virtual private network routes the call to the conference bridge 118 based on instructions programmed into the switches of the VPN 114.

In another embodiment, the router 112 determines if the conference address belongs to a predetermined set of address. When the conference address belongs to the predetermined set of address, the call is routed over the connection to the virtual private network.

Figure 4:
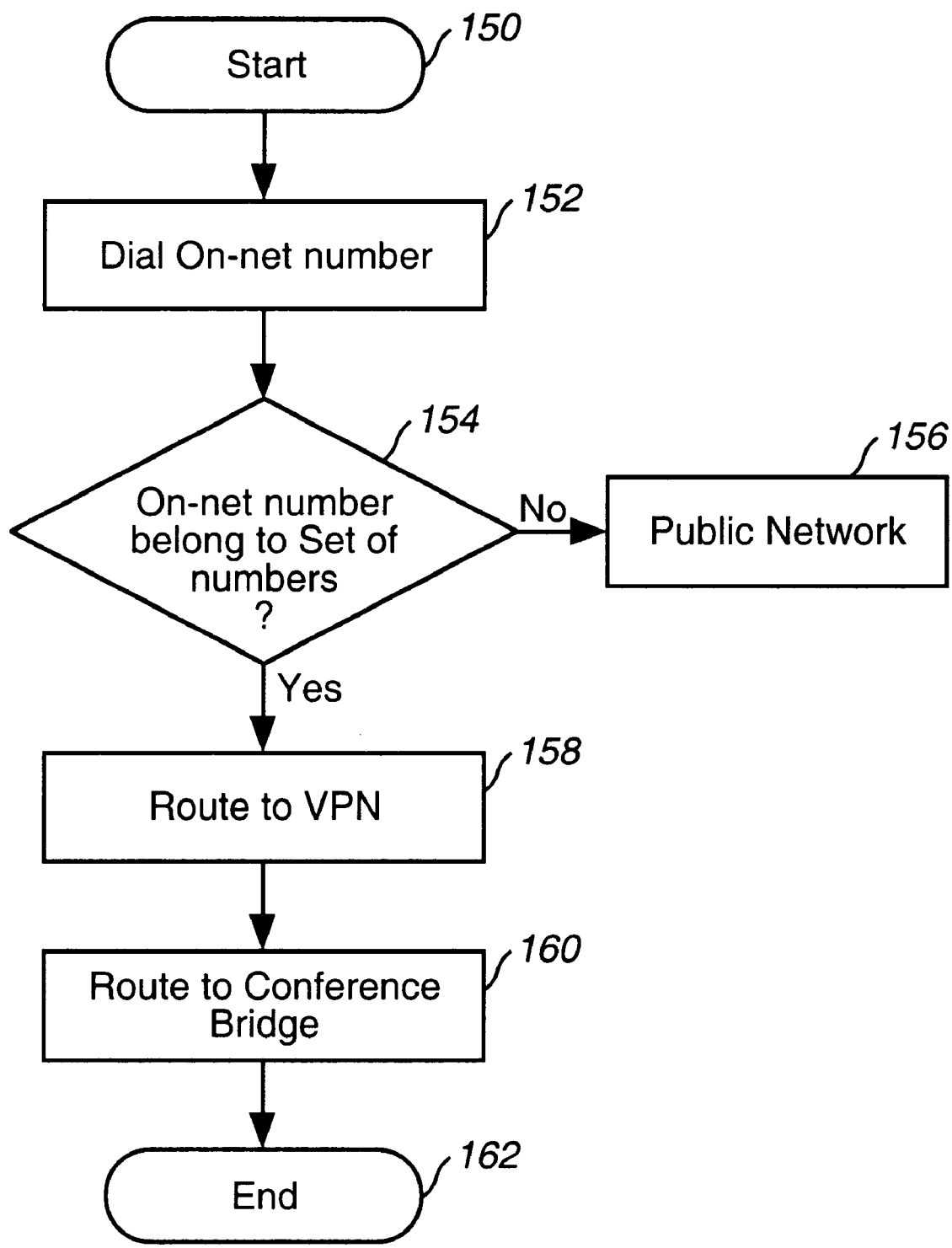
FIG. 4 is a flow chart of an embodiment of the steps of setting up a conference call.

FIG. 4 is a flow chart of an embodiment of the steps of setting up a conference call. The process starts, step 150, by the customer dialing an on-network telephone number at step 152. At a switch it is determined if the on-network number belongs to predetermined set of numbers at step 154. Note that the switch can be a PBX, a SSP or a router. When the on-network number does not belong to the predetermined set of numbers the call is sent to the public network for processing at step 156. When the on-network number does belong to the predetermined set of numbers (group of on-network numbers), the call is routed to a virtual private network at step 158. The virtual private network then routes the call to the designated conference bridge at step 160, which ends the process at step 162.

Figure 5:
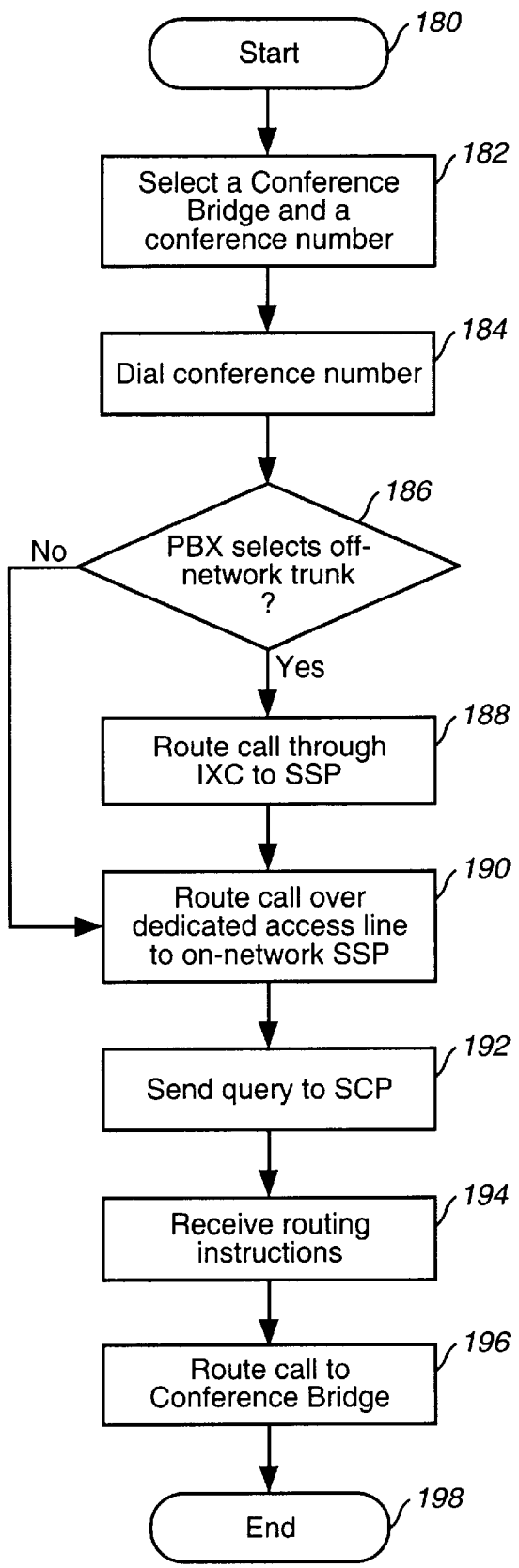
FIG. 5 is a flow chart of another embodiment of the steps of setting up a conference call.

FIG. 5 is a flow chart of another embodiment of the steps of setting up a conference call. The process starts, step 180, by selecting a conference bridge and a conference telephone number at step 182. The user then dials the conference telephone number at step 184. Next it is determined if the PBX selects an off-network trunk at step 186. When the PBX selects the off-network trunk, the call is routed through an interexchange carrier (IXC) to a Service Switching Point (SSP) at step 188. The SSP routes the call over a dedicated access line to an on-network SSP at step 190. Note that when the PBX does not select the off-network trunk at step 186, processing proceeds to step 190. Next, a query is sent to a Service Control Point (SCP) at step 192. At step 194, routing instructions are received from the SCP. Using the routing instructions the call is routed to the designated conference bridge at step 196, which ends the process at step 198.

Thus there has been described a method of setting up a conference call that reduces the cost of a conference call and will work for a PBX customer wanting to place an on-network conference call. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of setting up a conference call, comprising the steps of:
   (a) selecting a conference bridge and a conference telephone number;
   (b) dialing the conference telephone number;
   (c) when a private branch exchange seizes an off-network trunk, receiving the conference telephone number at an interexchange carrier service switching point;
   (d) routing the conference call to a local exchange carrier service switching point;
   (e) routing the conference call over a dedicated access line to an on-network service switching point;
   (f) triggering on the conference call at the on-network service switching point;
   (g) sending a query to a service control point;
   (h) receiving a routing instructions from the service control point; and
   (i) routing the conference call to the conference bridge.

2. The method of claim 1, wherein step (c) further includes the steps of:
   (c1) when the private branch exchange seizes an on-network trunk, routing the conference call to the on-network service switching point;
   (c2) proceeding to step (g).

3. The method of claim 1, wherein step (i) further includes the step of:
   (i1) routing the conference call over a virtual private network.

4. The method of claim 1, wherein step (h) further includes the step of:
   (h1) receiving a conference ID and a conference call code.

5. The method of claim 1, wherein step (f) further includes the step of:
   (f1) triggering on the conference telephone number.

6. The method of claim 1, wherein step (f) further includes the step of:
   (f1) triggering based on receiving the conference call over the dedicated access line.

7. The method of claim 1, wherein step (c) further includes the steps of:
   (c1) when the conference telephone number is dialed from a telephone not connected to a private branch exchange, receiving the conference call at a first local exchange carrier service switching point;
   (c2) routing the conference call to an interexchange carrier;
   (c3) proceeding to step (d).

8. The method of claim 1, wherein step (c) further includes the steps of:
   (c1) when the conference telephone number is dialed from a telephone not connected to a private branch exchange, proceeding to step (e).

9. A method of setting up a conference call, comprising the steps of:
   (a) dialing an on-network telephone number to initiate the conference call at a subscriber location having a private branch exchange connected to at least two interexchange carriers;
   (b) determining at a service switching point if the on-network telephone number belongs to a predetermined set of numbers, by:
      (b1) when the private branch exchange seizes an off-network trunk, routing the conference call to a local switch based on a standard routing procedure,
      (b2) triggering on the on-network telephone number at the local switch,
      (b3) sending a query to a service control point, and
      (b4) receiving routing instructions from the service control point if the on-network telephone number belongs to the predetermined set of numbers;
   (c) when the on-network telephone number belongs to the predetermined set of numbers, routing the conference call to a virtual private network switch; and
   (d) routing the conference call to a conference bridge.

10. The method of claim 9, wherein the step of receiving the routing instructions further includes receiving a conference call code.

11. The method of claim 9, wherein the step of receiving the routing instructions further includes receiving a conference ID.

12. The method of claim 9, wherein step (a) further includes the step of:
- (a1) dialing a pseudo-telephone number belonging to a group of on-network numbers.

13. The method of claim 12, wherein step (b) further includes the steps of:
- (b1) when the private branch exchange seizes an off-network trunk, failing to make a connection;
- (b2) returning to step (a).

14. The method of claim 12, wherein step (b) further includes the steps of:
- (b1) when the private branch exchange seizes an on-network trunk, determining if the pseudo-telephone number belongs to the predetermined set of numbers at the virtual private network switch;
- (b2) going to step (d).

15. The method of claim 12, wherein step (b) further includes the steps of:
- (b1) determining at the private branch exchange if the pseudo-telephone number belongs to the predetermined set of numbers;
- (b2) when the pseudo-telephone number belongs to the predetermined set of numbers, seizing an on-network trunk.

16. The method of claim 9, wherein step (a) further includes the steps of:
- (a1) requesting the conference bridge;
- (a2) receiving the on-network telephone number.

17. A method of setting up a conference call over a virtual private network, comprising the steps of:
- (a) entering a conference address at a subscriber location having a customer switch connected to the virtual private network and a public network to initiate the conference call;
- (b) when the customer switch seizes a connection over the public network, routing the conference call to a conference switch associated with the conference address;
- (c) determining a routing instructions to a designated conference bridge at the conference switch;
- (d) routing the conference call to the designated conference bridge;
- (e) when the customer switch seizes a connection over the virtual private network, determining routing instructions to a designated conference bridge, and
- (f) routing the conference call to the designated conference bridge.

18. The method of claim 17, wherein step (a) further includes the steps of:
- (a1) determining if the conference address belongs to a predetermined set of addresses at a customer switch;
- (a2) when the conference address belongs to a predetermined set of addresses, seizing a connection over the virtual private network;
- (a3) determining a routing instructions to a designated conference bridge;
- (a4) proceeding to step (d).

* * * * *